Aug. 23, 1955  L. E. STEIMEN  2,716,011

VIBRATION DAMPING DEVICES

Filed Aug. 4, 1951  2 Sheets-Sheet 1

*Inventor*
*Lawrence E. Steimen*
By his Attorney

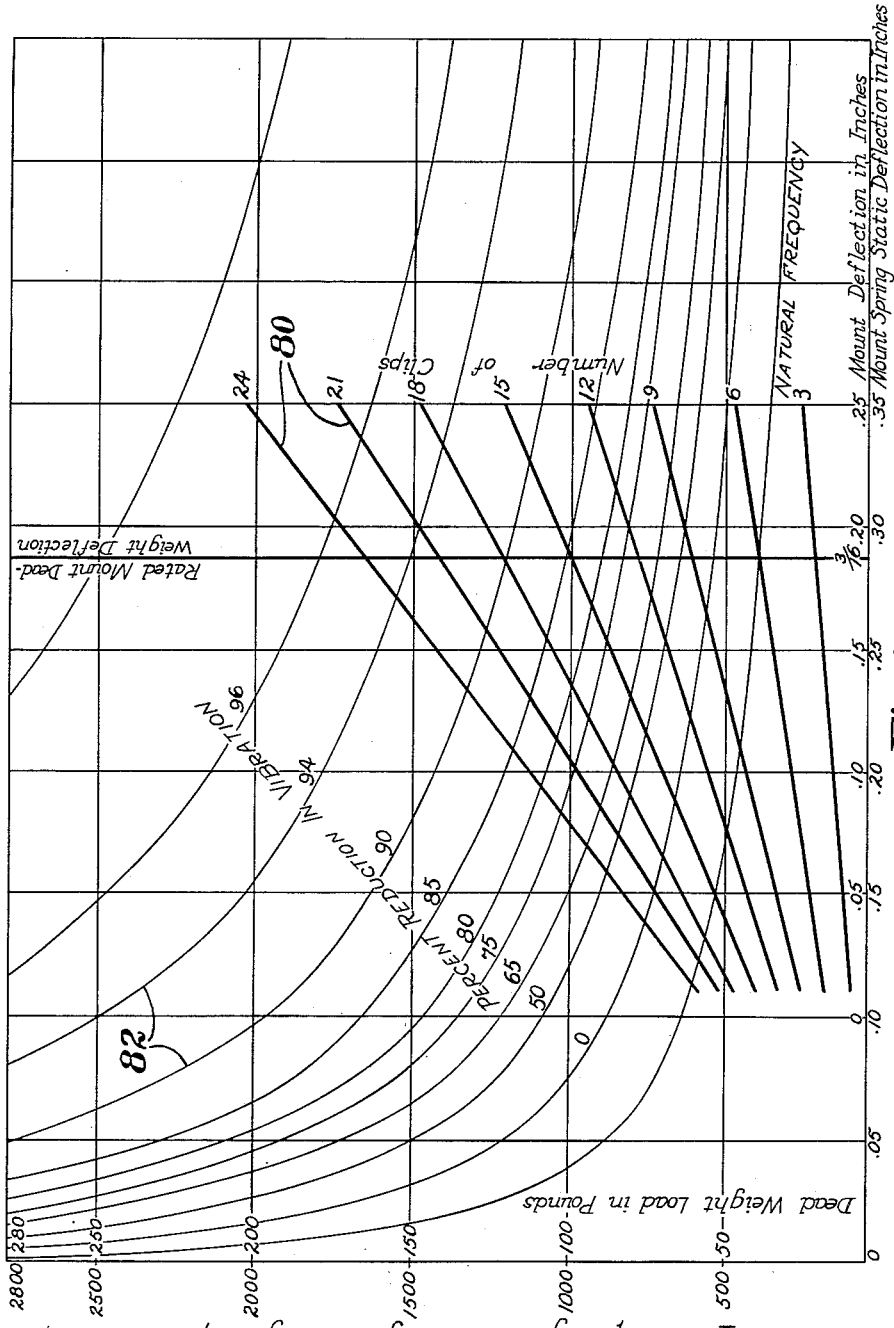

United States Patent Office 2,716,011
Patented Aug. 23, 1955

2,716,011

VIBRATION DAMPING DEVICES

Lawrence E. Steimen, Topsfield, Mass., assignor to United Shoe Machinery Corporation, Flemington, N. J., a corporation of New Jersey Application August 4, 1951, Serial No. 240,379

2 Claims. (Cl. 248—24)

This invention relates to vibration damping devices and is herein illustrated as embodied in a mount, one or more of which can be employed in supporting a machine above a base.

It is an object of the invention to provide a machine mount which will support loads of varying magnitudes and which at the same time will act to damp the vibrations caused by periodic disturbing forces applied to the machine.

Preferably, and as shown, the mount comprises a base and a support for one leg or other part of a machine, together with a plurality of looped springs positioned on the base and engaging the support for suspending the support above the base. Preferably, too, the support and base are provided with means for detachably holding a variable number of the springs in position in such manner that an optimum number of springs for a given dead weight load and particular frequency of periodic disturbing force may be conveniently located in the mount with the result that the transmission of the disturbing forces to the floor is accomplished with a minimum of objectionable vibration and noise.

It is proposed to make use of several mounts to form a complete mounting for a machine to be supported, each mount being placed beneath a leg or other base part of the machine so that the dead load of the machine is equally divided among the several mounts.

These and other features of the invention are disclosed in the following specification and in the accompanying drawings, and are pointed out in the appended claims.

In the drawings,

Fig. 3 is a chart illustrating applications of the invention.

Figure 1:
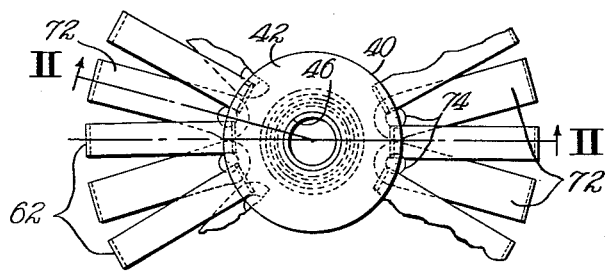
Fig. 1 is a plan view of a mount constructed in accordance with my invention.
Figure 2:
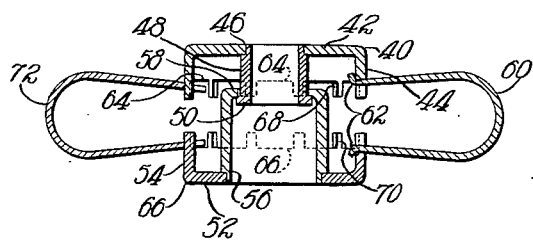
Fig. 2 is a cross-sectional view taken along line II—II of Fig. 1.

Each of the vibration mounts comprises a platform 40 having a flat portion 42 with a depending flange 44, and an opening 46 in which is welded a sleeve 48 having an outturned flange 50. The base 52 has an upturned flange 54 and an upwardly extending sleeve 56 having an inturned flange 58 surrounding the outturned flange 50 of the platform. The construction of the platform and base is such that the platform may move heightwise of the base but is limited in its upward movement by the engagement of the two flanges.

The load on the platform is supported by a number of looped springs 60 which have their end portions 62 positioned in vertically alined notches 64 and 66 respectively in the platform 40 and the base 52.

The portions of the flange 44 between the notches 64 in the flange 44 of the platform form projections or pins 68 which are in vertical alinement with similar projections or pins 70 in the base 52. These pins provide support for additional looped springs 72 the end portions of which have openings 74 which fit over the pins.

Preferably each of the springs 60 and 72 is preshaped and tempered so that when the ends thereof are positioned about one inch apart the spring scale will be about 30 pounds. By this construction of platform and base a variable number of springs can readily be assembled in the mount, the number used depending upon the dead load to be supported and the frequency of vibration of the imposed disturbing force as will hereinafter be set forth.

It is to be noted that the springs can be readily inserted as required by the simple operation of compressing a spring and placing the outturned ends in the notches 64 and 66 in the case of springs 60, or over the pins 68 and 70 in the case of springs 72, and releasing the pressure to permit the ends to press respectively against the platform and base. The springs are readily removable by a reverse process. It is to be noted that the springs should be equally spaced about the base and platform thus evenly distributing the load from the platform to the base. To preserve this condition it has been found advantageous when increasing the load carrying capacity of the mount to utilize the springs in groups of three also evenly spaced.

The central portion of the chart, Fig. 3, contains lines 80 indicating the number of springs or clips required for various dead weight loads and different mount spring static deflections, the ordinates representing the load in pounds and the abscissas representing the mount spring static deflection in inches indicated by the numbers below the base line. The numbers immediately above the base line indicate the deflection in inches of the mount after a load in applied thereto. In this instance it is to be noted that the mount springs as assembled were stressed to cause an initial spring deflection of .10 inch. The number of clips required for a given dead weight load and a given mount deflection can readily be ascertained from the chart. For example, for 50 pounds dead weight load and a rated mount deflection of $\frac{9}{16}$ inch the number of clips required will be between six and nine, nine being preferably used to preserve balance.

The natural frequency of vibration of a machine can be ascertained from the approximate formula $$f_n = 188\sqrt{\frac{1}{d_{st}}}$$

when $f_n$=natural frequency in cycles per minute; and $d_{st}$=the static deflection in inches.

Per cent transmissibility to the floor is given by $$T = \frac{1}{\dfrac{f_1^2}{f_n^2} - 1}$$

where T is the transmissibility expressed as a percentage of transmissibility if the machine were directly connected to the floor; and $f_1$ is the frequency of the disturbing force in cycles per minute.

The percentage reduction in vibration by the use of the present mount is represented by 1−T. In Fig. 3 curves 82 indicating per cent reduction in vibration are plotted for various values of frequency of the disturbing force and mount spring deflections or mount deflections. Thus for a disturbing frequency of 1500 and a rated mount deflection of $\frac{9}{16}''$ the reduction would be nearly 94 per cent.

From the foregoing it should be apparent that the invention provides a mount which because of its variable capacity can be readily adapted to use under widely different conditions of dead weight loading and frequencies of disturbing forces.

Having thus described my invention, what I claim as new and desire to secure by Letters Patent of the United States is:

1. A vibration damping mount for machines comprising a platform and a base having flanges extending toward each other, each of the flanges having spaced projections with the projections on the platform in vertical alinement with the projections on the base, looped springs positioned between the platform and base with end portions of the springs positioned in the spaces between the projections, sleeves on the platform and base projecting toward each other and positioned one within the other, and interengaging flanges on the sleeves for limiting movement of the platform outwardly of the base under forces exerted by the springs.

2. A mount for machines comprising a platform and a base having flanges extending toward each other, each of the flanges having spaced projections with the projections on the platform in vertical alinement with the projections on the base, looped springs positioned between the platform and the base with end portions of the springs located in the spaces between the projections, and additional springs positioned between the platform and the base with the end portions of each spring extending over two of the alined projections.

References Cited in the file of this patent

FOREIGN PATENTS 547,783     Germany _____ Apr. 26, 1930